United States Patent [19]

Orcutt

[11] Patent Number: 4,466,460

[45] Date of Patent: Aug. 21, 1984

[54] VALVE APPARATUS WITH IMPROVED MEANS TO PREVENT CROSS-VENTING

[75] Inventor: John W. Orcutt, Norton, Mass.

[73] Assignee: Texas Instruments Incorporated, Dallas, Tex.

[21] Appl. No.: 378,374

[22] Filed: May 14, 1982

Related U.S. Application Data

[60] Continuation of Ser. No. 206,936, Nov. 14, 1980, abandoned, which is a continuation of Ser. No. 59,005, Jul. 19, 1979, abandoned, which is a division of Ser. No. 803,530, Sep. 6, 1977, Pat. No. 4,206,645, which is a division of Ser. No. 501,711, Aug. 29, 1974, Pat. No. 4,063,682, which is a continuation-in-part of Ser. No. 422,954, Dec. 7, 1973, abandoned.

[51] Int. Cl.³ ............................................. E03B 3/00
[52] U.S. Cl. ............................ 137/625.2; 137/625.19; 137/625.21
[58] Field of Search ...................... 137/625.18, 625.19, 137/625.2–625.21

[56] References Cited

U.S. PATENT DOCUMENTS

| | | | |
|---|---|---|---|
| 3,033,226 | 5/1962 | Allen | 137/625.18 X |
| 3,074,431 | 1/1963 | Schwartz et al. | 137/625.2 X |
| 3,237,644 | 3/1966 | Beck et al. | 137/625.21 X |

Primary Examiner—William E. Wayner
Attorney, Agent, or Firm—John A. Haug; James P. McAndrews; Melvin Sharp

[57] ABSTRACT

This invention relates to improved components for an automatic temperature control system for automobiles. The control system operates on the proportional stroke principle and comprises an in-car air sensing tube biased with ambient air; a sensor in an aspirator at the end of the tube; a moving pivot operated directly by the output of the sensor; and a feedback valve operated by the moving pivot for driving a vacuum-assist motor, the output stroke of which operates the various electrical and vacuum functions of the heater-air conditioning system.

5 Claims, 8 Drawing Figures

VALVE APPARATUS WITH IMPROVED MEANS TO PREVENT CROSS-VENTING

This application is a continuation of Ser. No. 206,936, filed Nov. 14, 1980, abandoned which is a continuation of Ser. No. 059,005, filed July 19, 1979, abandoned which is a divisional of Ser. No. 803,530, filed Sept. 6, 1977, now U.S. Pat. No. 4,206,645, which is a divisional of Ser. No. 501,711, filed Aug. 29, 1974, now U.S. Pat. No. 4,063,682, which is a continuation-in-part of Ser. No. 422,954 filed Dec. 7, 1973, now abandoned.

BACKGROUND OF THE INVENTION

A. Field of the Invention

This invention relates in general to components of an automatic temperature control system for automobiles.

B. Description of the Prior Art

Automatic temperature control systems were first introduced in about 1964 in the United States and are now available on most large size cars. In the systems heretofore, the components of the system have been scattered throughout the car, being interconnected by vacuum and wiring harnesses. One of these systems, for instance, has a main component grouping on the power servo, with other hardware located on the dash control, in ducts, on the air conditioning case, and in the engine compartment. Another has many components grouped on the heater-air conditioning case, with other components on the dash control, under the dash and in the engine compartment. These systems are generally complicated, difficult to install and maintain, expensive to produce and inaccurate.

The components of such systems and their function is as set forth below:

1. Sensors—to sample in-car and ambient temperature;
2. Transducers—to convert the sensors' output to a control signal;
3. A power servo—to convert the control signal to a stroke, thereby driving program switches and a temperature door. Bimetal sensors have been used to sense temperature changes and provide a signal responsive thereto for many years. However, the signal from such a sensor is very small and is rarely able to provide the necessary force to activate a mechanical or electrical system of which the sensor is a part;
4. Program switches—to control system functions such as air discharge location, blower speed, recirculation, water valve, on-off function, etc.;
5. A temperature blend door—to modulate the air discharge temperature from the heater-air conditioning system;
6. Dash controls—contains levers used by the driver of a car to adjust and set the system to the desired mode and condition of operation;
7. Selector switches—operated by the dash controls;
8. Cold engine lockout (CELO) valve—to delay the system operation in its heater mode until the heater core is warm;
9. Compressor ambient switch—to control the compressor operation as a function of the ambient temperature;
10. A water valve—controlled by a program switch to turn water off to the heater core under maximum cooling conditions; and
11. A resistor block—contains a dropping resistor for fan speed control. This works in conjunction with the program switches.

There are many problems associated with these systems.

In operation, these systems generally have two sensors which individually sense the ambient and in-car temperature and convert these readings to either electronic or mechanical signals. The ambient signal is used to bias the in-car signal and the single output is used to control the operation of the system. The appropriate temperature is generally supplied by the operation of a temperature door whose opening and closing regulates the heat and air conditioning supplied from the heater and air conditioner.

Since the sensors are often mounted at the end of long tubes supplying the in-car and ambient air, error in the sensing apparatus is often introduced by the air passing through long super-heated stretches which bias the temperature of the incoming air. For instance, the in-car air is often sampled by letting air enter a tube which is underneath the dash. By the time the air reaches its sensor near the fire wall, the temperature of the air in the tube has often reached an elevated temperature to that of the original air by reason of bias occurring when the air passed through heated areas under the dash. This problem has sometimes been corrected by placing both sensors at the spot where sampling air was taken in, but this requires long electrical leads and electrical conversion signals for changing the temperature of the air sensed to an appropriate electrical value.

In these systems, the output stroke of the power servo is proportional to the vacuum level therein which in turn is proportional to the sensor signals from the two sampling devices. This is called a "proportional vacuum" system. A proportional vacuum system is subject to stroke hysteresis, i.e., there may be two different output strokes at the same vacuum level. As the transducer signal does not have a feedback loop, the sensors and transducers combination does not know where the servo motor stroke is at any given time, which causes drift, cycling and over-shoot.

Hysteresis is caused by the frictional forces required to drive the program swithches, to open the temperature doors, by the override springs, and by various pin hole tolerances. Further, hysteresis is not constant from one system to another and will deteriorate with time.

In these prior art systems, as the vacuum level increases, the servo motor strokes towards maximum air conditioning mode operation while with decreasing vacuum the servo motor drives towards maximum heater condition. The friction in the system, however, causes the stroke to reach different positions for the same temperature, depending on whether the vacuum is increasing or decreasing. Current systems take two steps to alleviate these conditions and effect acceptable control. One is to provide high vacuum levels so that the slope of the control curve increases. This serves to decrease the differences in stroke for the same temperature. The second means used is to provide low friction program switches. These two means do serve to reduce hysteresis, but they present problems themselves in that the use of high vacuum level is hard to attain on the present-day automobiles with their numerous pollution control devices, especially on long hill climbs and the use of low friction switches is expensive.

There are two types of vacuum motors, or power servos, currently used to supply output to a shaft from a supply of vacuum. These are often used to operate car doors, as well as to drive switches in an automatic temperature control system. Generally, these motors consist of two case halves (the cylinder) which entrap a diaphragm upon which is mounted a rigid piston with an output shaft. One case half has a port connected to a source of vacuum and the other half is open. As vacuum is varied through the port, the motor strokes towards and away from the case half containing the port.

One type of such motor is called a rolling diaphragm motor and the other is the flip-flop diaphragm motor.

Vacuum switches or valves are used in automotive applications in an on-off mode to apply vacuum to various places within the system to open and shut air supply doors, etc. In the automatic temperature control system of the present invention, vacuum switches are used for such things as determining the air discharge location, blower speed, recirculation operation mode, water valve operation, etc. Several types of such switches are presently on the market, all of which have certain disadvantages.

One type is generally made of two die case pieces which are lapped smooth. Ports are provided in one half while the other has channels so that when the second half is rotated it either provides a channel from one port to the other so that vacuum can be switched from one port to another, or its closes the ports. These switches have generally required a fairly high force to overcome friction and cross-venting of the ports has resulted in serious vacuum leakage and loss of vacuum, especially on long hill climbs. This loss of vacuum causes a loss of control in all of the vacuum systems.

Another such switch has the movable portion made of rubber, which is molded to a metal plate. Here the switch has very small ports, on the order of 0.020 inches, with relatively large rubber sealing contact areas. The small size of the ports often allows blockage due to frost or accumulation of dirt.

In my copending U.S. Pat. Nos. 4,063,682; 4,206,645; 4,269,351; 4,291,717 and 4,426,913; apparatus is shown for an improved automatic temperature control system for automobiles whereby the operator may set a desired in-car temperature and the control system will operate the heater and air conditioning systems to keep the in-car temperature at the selected mark.

Such apparatus provides an accurate means of maintaining the selected temperature by eliminating frictional losses and providing for low hysteresis, in reducing the amount of vacuum required from the engine, and by negating the inaccuracies of return springs. It eliminates certain electrical relays and override springs, thereby cutting complexity and cost. It groups the components in a single module at the fire wall so that under-dash congestion is reduced and a compact, easily producible, relatively inexpensive, module type system is attained. The module concept allows system calibration at the factory and easier servicing once the car is in use since all important elements are under the hood in one place. Further, this system allows low vacuum operating levels and option possibilities such as variable blower speed; high blower coming on when engine is started under hot soak start-up conditions; diagnostic functions for vacuum, electrical and automatic operations; and low blower come-on under cold soak start-up condition.

The ambient and in-car air is fed through a delivery tube wherein the in-car air is biased by the ambient air so that only a single temperature sensor is required. The sensor directly drives a vacuum-vent valve mounted on the output member of a vacuum-assist motor, thereby monitoring the relative position of the sensor and the vacuum assist output and physically moving with the stroke of the motor to form a feedback loop. This valve applies vacuum or vent to the assist motor to drive the stroke to its proper position and thereby maintain the desired temperature in the car. The stroke of the vacuum-assist motor operates various switches causing the operation of the system components, such as the temperature blend door, the CELO valve, the water valve, etc. Thus this is a proportional stroke system, as opposed to the prior art proportional vacuum systems.

The sensor is attached to the long end of an input link which is normally in a horizontal position. When the sensor moves because of a change in in-car or ambient temperature, the vacuum-vent valve is activated by reason of the mechanical advantage in the linkage. This activation causes the valve to change the vacuum level in the vacuum-assist motor, causing it to stroke to such a position, against spring force, that the linkage is again brought to its horizontal rest position, whereupon the system again comes to rest.

The entire system comprises only three cables, twelve electrical contacts, ten vacuum connections (serving eight functions) a cold engine lockout switch, the double walled tube, and the control module. Using this module system where all the components are grouped in one place greatly increases the reliability of the total system, e.g., less parts are required, the hysteresis losses are minimized, there are fewer external electrical and vacuum connections, etc.

Also shown and described in the referenced patents are improved components of the system. One vacuum-vent valve used to control the vacuum-assist motor in the feedback loop is of a novel "H" valve type wherein twin diaphragms are provided in the valve to negate the effect of a single diaphragm on the valve's operation. A balance chamber is provided so that both diaphragms see the same vacuum level.

Another vacuum vent valve shown and described is of a flapper valve type. Here too the input link is directly connected to the bimetal sensor, which causes the valve to vary the vacuum input to the vacuum-assist motor and thus vary the output stroke of this motor.

A new vacuum-assist motor, generally of the rolling diaphragm type, is shown wherein the cylinder wall is sloped to increase the stroke, with the same case depth, and allow for a shallower overall motor to be used.

Reference may be had to the patents mentioned above for a further detailed description of the temperature control system and components thereof.

According to the present invention, a new rotary vacuum valve or switch is described wherein twin contact lines on the movable part of the valve eliminates cross venting from port to port and wherein the wiper blades can take more out-of-flatness without leaking.

DESCRIPTION OF THE PREFERRED EMBODIMENTS

Figure 1:
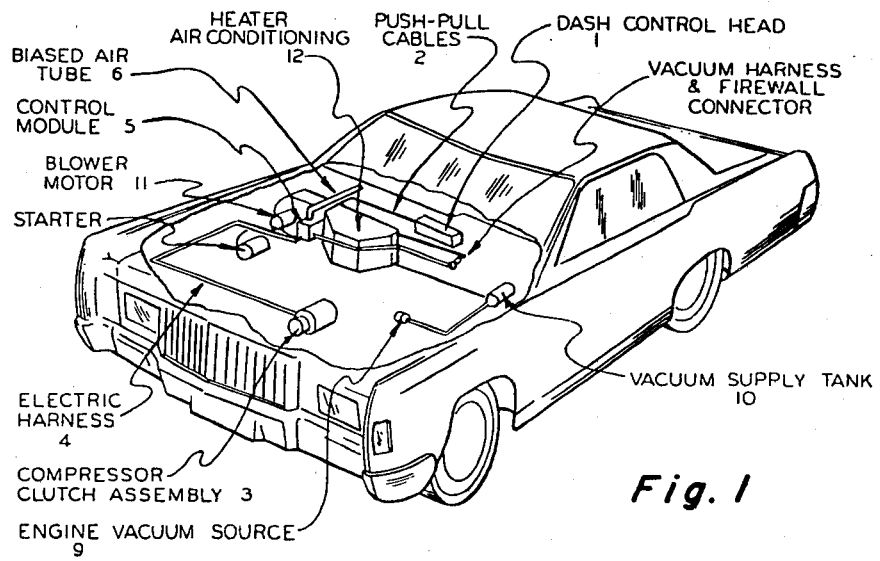
FIG. 1 is a partially cut away, prospective view of an automobile showing the installation of the automatic temperature control system of this invention.
Figure 2:
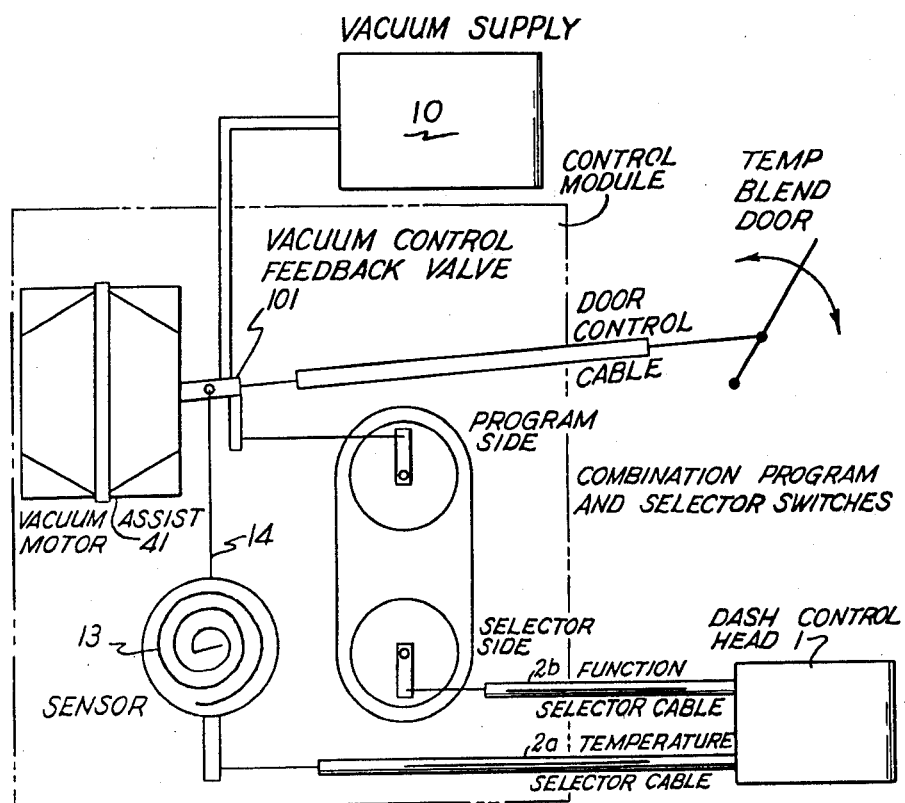
FIG. 2 is a schematic view of the control module, the vacuum supply, the temperature blend door, the dash control head and the interconnecting cables of this invention.

FIGS. 1 and 2 show the general arrangement of the components in the automatic temperature control system of the present invention. The driver of the automobile selects the mode and the temperature he desires by moving the controls on the dash control head 1. For instance, he might select automatic mode with a temperature of 75° F. This input is introduced into the system through two push-pull or tension cables 2, one selecting the mode and one the temperature at which the system will operate. These are conveniently Bowden cables, although other types could be used as well. The selection at the dash control head 1 commences the operation of the automatic temperature control system.

The blower motor for the fan is shown generally at 11 in FIG. 1. The compressor clutch assembly is connected to the control module 5 through electric harness 4.

Figure 4:
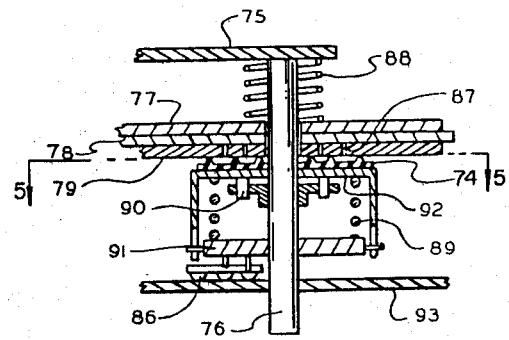
FIG. 4 is a cross-sectional view of the program side of the present invention showing vacuum program disc 74 taken through lines 4—4 of FIG. 5.
Figure 6:
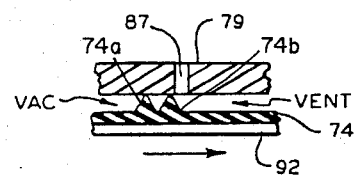
FIG. 6 is a detailed cross-sectional view of a portion of the rotary vacuum switch or valve of the present invention, shown in FIG. 8 and taken on line 6—6 of FIG. 5.

The control module 5, as best shown in FIG. 2, groups most elements at one place on the heater-air conditioning case 12, between the fan and the evaporator case (not shown), rather than being spread throughout the automobile as has been previously done. The items in this compact module are: a bimetal sensor 13 as shown in FIG. 2; the vacuum-assist motor 41 with feedback valve such as best shown in FIG. 2; program switches and valves, such as shown in FIGS. 2, 4 and 6; selector switches and valves operated by controls on the dash control head; the compressor ambient switch; and the resistor block for the fan. The control module 5 is connected to the dash control head by means of two push-pull cables 2, one for temperature selection 2b and the other for mode selection 2a. A third cable connects the vacuum-assist motor 41 to the temperature blend door, as shown in 2. The control module 5 occupies a space approximating a cube of 6 inches on a side.

Figure 7:
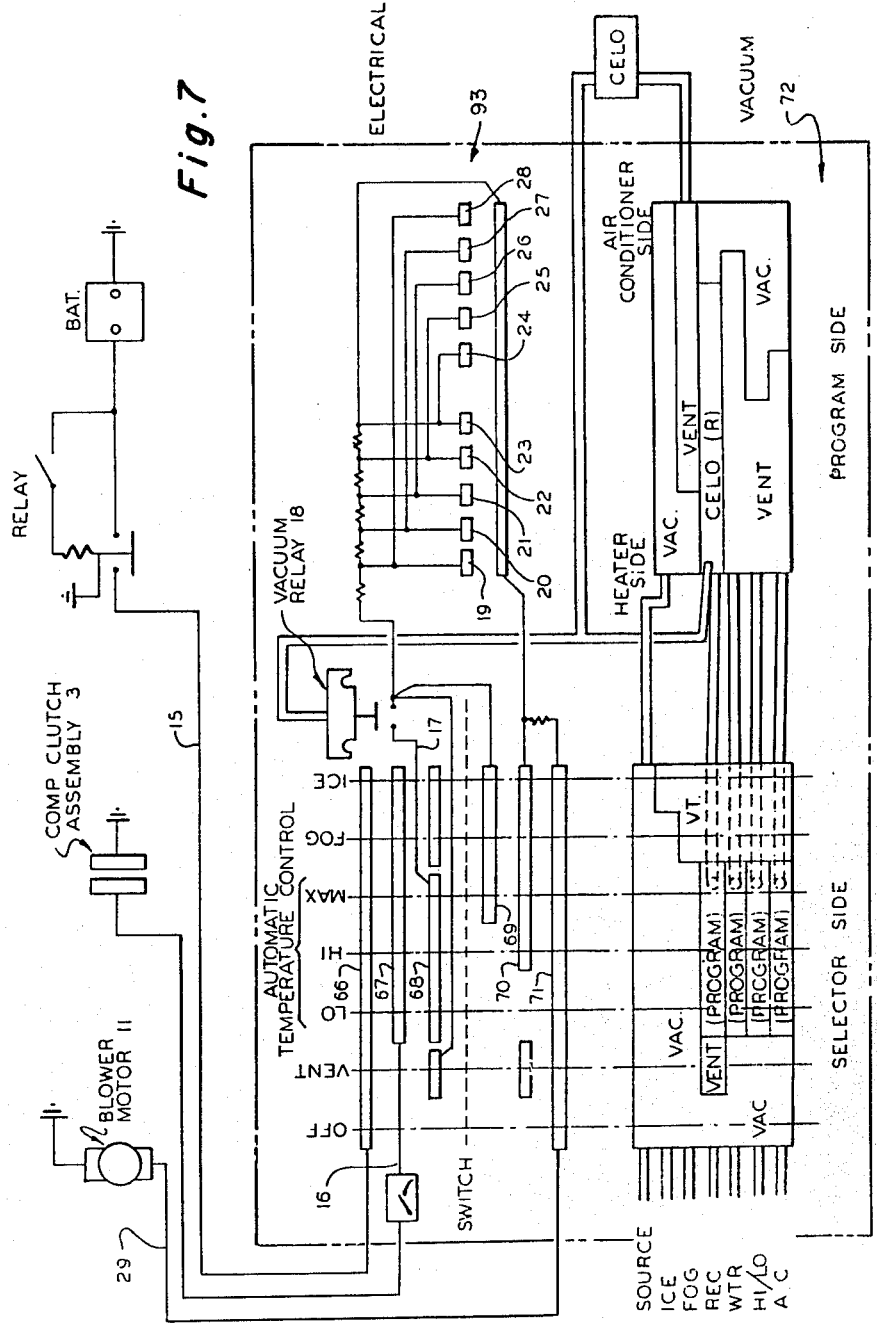
FIG. 7 is the electrical and vacuum diagram for the automatic temperature control system of this invention.

Vacuum is supplied to a vacuum-assist motor 41 located in the control module 5 from the engine vacuum source 9 through the vacuum supply tank 10. The position of the output stroke of motor 41 causes vacuum to be supplied through various valves or switches to activate the various stations of the system, such as the CELO valve, etc. The position of its stroke also activates the program electrical switches of the system. The complete vacuum and electrical schematic is shown in FIG. 7 and the operation of the stations corresponding to the length of the stroke is portrayed in FIG. 8 to be discussed in detail later.

By the use of this control module 5 a vastly improved automatic control system is provided since the wiring harness almost disappears and there are no electrical connections at the firewall or leads inside the car. The control module system moves everything under the hood and significantly frees the under-dash area. The electrical harness here is reduced over 90 percent from prior art manual systems.

Figure 8:
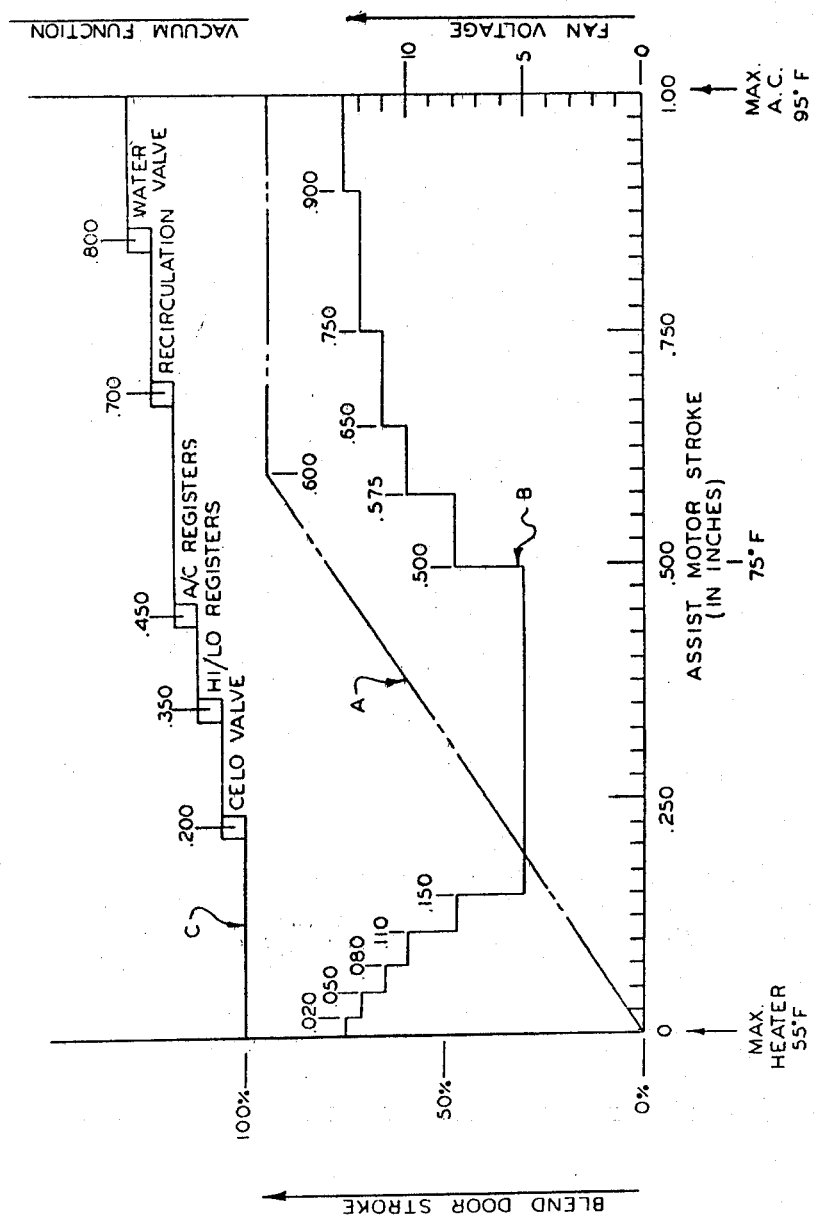
FIG. 8 is a graph showing the stroke of the vacuum-assist motor vs. the movement of the blend door, the fan voltage and the activation points of various components in the present invention.

Generally, in existing automatic temperature control systems, the range between the full heater and full air conditioning operation is 40° F., with the mid-point being 75° F. and that arrangement has been used here. As more fully discussed later, as the in-car temperature deviates from the 75° F. point, the control stroke of vacuum motor 41 will respond according to the bimetal sensor 13. The total stroke of the vacuum-assist motor 41, as caused by the bimetal sensor, is 1 inch. Therefore, the ½-inch mark is the mid-point or 75° F. A half inch deviation from this mid-point in either direction will drive the system either to full heater or full air conditioning operation. At a 55° F. in-car temperature, for example, the control stroke would have moved one-half inch as shown in FIG. 8 to full heater operation. Ambient sensitivity is only one-fifth that of in-car, and would require a 200° F. change to drive the vacuum motor full stroke. Therefore, a 100° F. ambient change from the 75° F. mid-point is required to force the control stroke to either maximum heater or maximum air conditioning due solely to changes in ambient temperature.

With my new vacuum-assist motor the entire system works off of a 5-inch vacuum supply.

There are two distinct sides or general functions involved in my system: the selector side and the program side, as shown in FIGS. 2 and 7. FIG. 8 illustrates the operation of the programmer side of the system in graphic form as the assist motor 41 strokes to control the blend temperature door opening and operate the various stations in the system. FIG. 7 shows the electrical and vacuum operation of the automatic temperature control system of this invention. It should be noted here that this system only operates on the air side of the temperature control system and does not control the chemical or Freon side. The program side contains electrical contacts and vacuum ports which are activated according to the position of the stroke of the vacuum-assist motor 41. The selector side also contains electrical contacts and vacuum ports, but these are activated manually according to the mode of operation selected by the operator of the vehicle at the control head 1. The selector side can cause the program side to be overridden, e.g., in the off, vent, fog and ice modes. Altogether my system has 12 electrical switches, 6 on the selector side and 6 on the program side. It also has 8 vacuum functions requiring the use of 10 ports. The 6 electrical switches on the program side vary the voltage of the blower, as shown by line B in FIG. 8. The 6 electrical switches on the selector side activate the electrical input to the system, compressor ambient switch, and 4 functions relating to the blower: the CELO valve, the blower motor itself, and the high range and maximum range selectors. The 10 vacuum ports control: the source of vacuum; recirculation (2 ports); CELO valve (2 ports); High/Low Registers; Air Conditioning Registers; Water Valve; Fog Mode; and Ice Mode.

In FIG. 8, line A indicates the relationship of the temperature blend door stroke to the assist-motor 41 stroke, line B indicates the voltage applied to the variable speed fan vs. the assist-motor 41 stroke, and line C indicates where the operations there indicated are cut into or out of the system according to the assist motor stroke. As one example, at an assist-motor stroke of 0.5 inches, corresponding to an in-car temperature of 75° F. and at the motor's mid-stroke point, a fan voltage of 8 volts is shown, which is approximately 60 percent of the fan's full capacity which occurs at an assist-motor stroke of 0.9 inches. Meanwhile, the temperature blend door is at approximately 75 percent of its total opening and the CELO valve, High-Low Registers and Air Conditioning Registers have all been activated, while the Recirculation and Water Valves have not. The blend door is directly attached to the output arm of vacuum-assist motor 41 by means of a push-pull cable.

With particular reference to FIG. 7, the driver of the automobile will select one of the positions (modes) on the dash control head 1, such as hi-automatic temperature control. He would also select the temperature at which he wishes the car to be kept at the control head. This selection, on the selector side, will cause the operation of the relay shown generally by the line 15 through the battery indicated, by reason of contact 66 being closed. It likewise will engage the compressor clutch assembly through line 16, by closing contact 67. The vacuum relay 18 closed by the CELO valve, feeds line 17 by reason of contact 68 being closed. The blower motor is activated by line 29 through the closing of contact 71 and high speed operation is caused by closing contact 70. Contact 69 is thus the only open contact in the Hi-mode operation.

In vacuum operation, on the selector side, the Source, Ice and Fog ports would be supplied with vacuum, while operation of the Recirculation Valve, Water Valve, High-Low Registers, and Air Conditioning Registers would be controlled by the program side.

On the program side, the electrical contacts 19-28 would determine the speed at which the blower motor operates and the operation of the various vacuum functions are controlled as shown schematically at 72 in FIG. 7. Each of these electrical and vacuum operations are determined by the position of the output arm of the vacuum-assist motor 41, as shown in FIG. 8.

As the operator sets the system for automatic temperature control, a push-pull cable, as shown in FIG. 2, rotates the input shaft of the selector side of the system. The rotation of this shaft (not shown) would activate certain vacuum ports and the electrical contacts as described above in connection with FIG. 7. At the same time, he would set the temperature lever at the control head 1 to the in-car temperature he desired. This lever, also through a push-pull cable, would rotate a cup in which the bimetal sensor 13 reposes. The inner end of the bimetal coil sensor 13 is affixed to the cup so that rotation of cup would cause the output arm 14 operatively connected to the outer end of coil sensor 13 to move to the desired setting. The setting now acts as reference point for future corrections by the temperature control system. As the biased in-car air passes over the sensor 13, as described below, its output arm will move dependent upon the temperature of the biased air.

The in-car and ambient temperatures are sensed by air flowing through tube 6, a double-walled, biased tube which contains the sensor 13. This tube indicated generally by the numeral 6, is mounted behind the crash pad area of the automobile underneath the dashboard. In-car air passes to the bimetal sensor 13 which is mounted in an aspirator housing. At the same time, ambient air is taken into the aspirator housing whereby it passes to the outer annular walls of the double wall 6. The ambient air exits near the crash pad. Thus the ambient air will cause the in-car air to become biased by heat transfer. In addition to this biasing effect, the ambient air provides a moving insulating barrier which will essentially reduce any unwanted temperature bias arising from the external heated air under the dashboard.

Since the vacuum-assist motor 41 works directly from the sensor through the feedback valve in this proportional stroke system without intervening mechanical linkages as present in a conventional proportional vacuum system, almost all hysteresis loss is eliminated. Further, since the feedback valve and vacuum-assist motor stroke member in this system are insensitive to forces present in the program switches, low cost, high force program switches may be used to reduce expense. Also, return spring characteristics are not critical since they only supply the return force, and do not determine the position of the output stroke member when it reaches equilibrium. The stroke position is determined by the bimetal sensor-feedback valve combination which is directly proportional to the position of the bimetal sensor 13.

Figure 3:
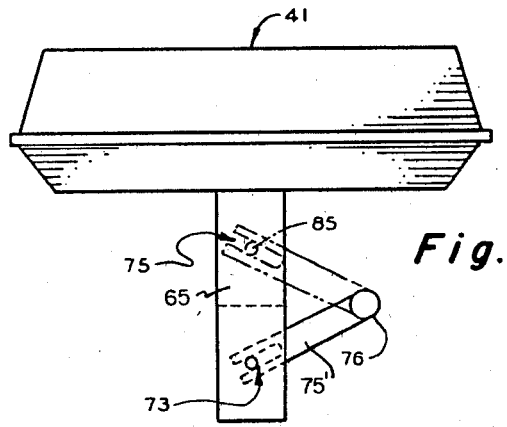
FIG. 3 is a partially schematic view showing the connection of the output of the vacuum-assist motor to the program switches.
Figure 5:
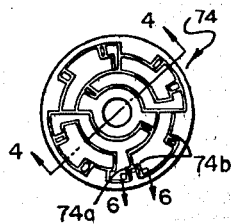
FIG. 5 is a top view of the gasket of the rotary vacuum valve or switch of the present invention as it would be seen looking downwardly at line 5—5 of FIG. 4.

Movement of the output arm of vacuum-assist motor 41, shown in FIGS. 3 and 4, is transferred to program signals as will be described below. Peg 85 is fixed to output arm 65 and is disposed in slot 75 formed in arm 75' to form a bell crank 73. Thus as output arm 65 strokes up and down with peg 85 sliding in slot 75, as seen in FIG. 3, arm 75' which is rigidly attached to shaft 76 pivots causing shaft 76 to rotate. Fixedly attached to shaft 76 of the program side of the invention, shown in FIG. 4, is a switch bushing 90, which in turn is rigidly attached to vacuum disc backup plate 92, upon which is fixedly attached vacuum program disc 74, as shown in detail in FIG. 5. A bottom surface of vacuum distribution plate 79 is biased against a top surface of vacuum program disc 74 through spring 88 seen in FIG. 4. Thus, vacuum program disc 74 rotates with the movement of shaft 76, which causes multiple sets of twin protrudences which are part of the disc extending from the top surface thereof to open and close the ports 87 in vacuum distribution plate 79. FIG. 6 shows in cross-section one set of these twin protrudences 74a and 74b extending from the top surface of disc 74 separating a passageway defined on the surface between a first portion connectable to vacuum and a second portion connectable to vent and the corresponding port 87 which the protrudences control. The shape of the protrudences shown in FIG. 6 in cross-section are triangular, but the use of other shaped protrudences is perfectly acceptable. The use of the twin protrudences allows ports to be as large as required, typically 0.040 to 0.060 inches, because the dual contact points of the protrudences which, as seen in FIG. 6, are spaced apart greater than the diameter of the port, do not allow cross venting to take place. Vacuum program disc 74 is provided with a network of protrudences which form a plurality of passageways so that as the disc is rotated along with shaft 76 selected ports 87 leading to appropriate valves to be operated are placed in communication with vacuum or vent.

Main contact carrier 91 is rigidly attached to shaft 76 causing electrical contacts and carrier 86 to make and break the contact switches 19-28 shown in FIG. 7. Ports 87 are appropriately connected through gasket 78 and top plate 77 to the appropriate valve to be operated. The electrical contacts and carrier 86 operate circuits through electric circuit plate 93. Springs 88 and 89 insure the proper tension for the necessary surface contact and sealing. The diameter of the program side, as shown in FIG. 4, is approximately 1-½ inches.

Although this invention has been described with particular emphasis upon an automatic temperature control system for automobiles, the items are not limited to the specific structure of this system or to a temperature control system at all, but are applicable to many different applications. By the specific description herein recited, it is not intended to limit the applicability of these items or system, and it is to be understood that a coverage as wide as the applicable art will allow is being sought.

I claim:

1. Valve apparatus having improved means to prevent cross-venting comprising a first member having a surface with at least one port in communication therewith, the port having a selected diameter and being connectable to control means, a second member having a surface generally parallel to the surface of the first member and biased thereagainst, the surfaces being slidably movable relative to one another, at least one passageway defined on the surface of the second member and aligned with the port, the passageway having first and second portions separated from one another by a pair of protrudences extending from the surface of the second member and culminating in contact portions, the contact portions spaced apart greater than the diameter of the port to preclude communication between the first and second passageway portions upon sliding movement of the surfaces relative to one another.

2. Valve apparatus according to claim 1 in which the first passageway portion is connectable to a vacuum source and the second passageway portion is connectable to a vent.

3. Valve apparatus according to claim 1 in which the surfaces are generally planar.

4. Valve apparatus according to claim 1 in which the shape of each of the protrudences in cross-section is triangular.

5. Valve apparatus according to claim 3 in which the second member is a program disc having a plurality of pairs of protrudences, the disc mounted on a rotatable shaft, the first member being provided with a plurality of ports, each connected to control means, the protrudences arranged so that rotation of the shaft will cause a selected sequence of operations through the control means.

* * * * *